(12) United States Patent
Chang et al.

(10) Patent No.: US 7,165,137 B2
(45) Date of Patent: Jan. 16, 2007

(54) SYSTEM AND METHOD FOR BOOTING FROM A NON-VOLATILE APPLICATION AND FILE STORAGE DEVICE

(75) Inventors: Robert Chang, Danville, CA (US); Jong Guo, Castro Valley, CA (US); Farshid Sabet-Sharghi, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 371 days.

(21) Appl. No.: 09/923,874

(22) Filed: Aug. 6, 2001

(65) Prior Publication Data

US 2003/0028760 A1 Feb. 6, 2003

(51) Int. Cl.
G06F 13/00 (2006.01)
G06F 12/00 (2006.01)
G06F 12/14 (2006.01)
G06F 9/445 (2006.01)
G06F 11/00 (2006.01)

(52) U.S. Cl. .................. 711/102; 711/104; 711/163; 711/154; 711/165; 711/202; 711/219; 713/2; 710/200; 714/6

(58) Field of Classification Search ........ 711/102–104, 711/154, 163, 165, 202; 713/1, 2, 501, 502; 714/6; 710/200
See application file for complete search history.

(56) References Cited

U.S. PATENT DOCUMENTS

| | | | |
|---|---|---|---|
| 5,022,077 A | 6/1991 | Bealkowski et al. | |
| 5,295,117 A | 3/1994 | Okada | |
| 5,410,699 A * | 4/1995 | Bealkowski et al. | 713/2 |
| 5,459,850 A | 10/1995 | Clay et al. | |
| 5,535,357 A | 7/1996 | Moran et al. | |
| 5,579,522 A * | 11/1996 | Christeson et al. | 713/2 |
| 5,592,641 A | 1/1997 | Fandrich et al. | 711/103 |
| 5,606,660 A | 2/1997 | Estakhri et al. | 714/38 |
| 5,809,559 A * | 9/1998 | Kim | 711/202 |
| 6,058,048 A | 5/2000 | Kwon | |
| 6,154,838 A * | 11/2000 | Le et al. | 713/2 |
| 6,167,532 A | 12/2000 | Wisecup | |
| 6,216,224 B1 * | 4/2001 | Klein | 713/1 |
| 6,263,399 B1 * | 7/2001 | Hwang | 711/103 |
| 6,601,167 B1 | 7/2003 | Gibson et al. | |
| 6,714,479 B1 | 3/2004 | Takahashi et al. | |
| 6,715,074 B1 * | 3/2004 | Chaiken | 713/164 |
| 6,718,464 B1 * | 4/2004 | Cromer et al. | 713/2 |
| 2002/0138702 A1 * | 9/2002 | Gefen et al. | |
| 2003/0028760 A1 | 2/2003 | Chang et al. | |

FOREIGN PATENT DOCUMENTS

EP 1343082 A2 9/2003

(Continued)

OTHER PUBLICATIONS

"Notification of Transmittal of the International Search Report or the Declaration", corresponding PCT application No. PCT/US02/24980, International Searching Authority, European Patent Office, Sep. 12, 2003, 7 pages.

(Continued)

Primary Examiner—Mano Padmanabhan
Assistant Examiner—Mardochee Chery
(74) Attorney, Agent, or Firm—Parsons Hsue & de Runtz LLP

(57) ABSTRACT

A system for booting a microprocessor controlled system wherein a basic interface between the processor and peripheral devices is copied from an application and file storage device into random access memory without usage of the microprocessor or need for a non-volatile code storage device.

25 Claims, 6 Drawing Sheets

FOREIGN PATENT DOCUMENTS

| | | |
|---|---|---|
| GB | 2304209 | 3/1997 |
| JP | 58-112118 | 4/1983 |
| JP | 3091838 | 4/1991 |
| JP | 6-266552 | 9/1994 |
| JP | 7500935 | 1/1995 |
| JP | 11-316687 | 11/1999 |
| WO | WO 93/09495 | 5/1993 |
| WO | WO 01/52062 A2 | 7/2001 |

OTHER PUBLICATIONS

Dagan TME, Sharon, "Designing the DiskOnChip® as a Flash Disk & Boot Device Replacement", M-Systems, Rev. 1.0, Jan. 2001, 13 pages.

Japan Patent Office, "Notification of Reasons for Refusal", mailed in related JP 2003-519787 on Jul. 19, 2005, 8 pages (including translation).

China Patent Office, "Notification of the First Office Action", mailed in related application No. 02802692.6 on Jul. 8, 2005, 17 pages (including translation).

EPO Office Action, mailed in corresponding EP Application No. 02 752 716.7 on Aug. 1, 2005, 7 pages.

ISA/EPO, "Notification of Transmittal of the International Search Report or the Declaration", mailed Sep. 22, 2004 in corresponding PCT/US03/31010, 7 pages.

USPTO, Office Action, mailed in U.S. Appl. No. 10/263,576 on Jun. 6, 2005, 11 pages.

Japanese Patent Office, Decision of Refusal, mailed in related Japanese Application No. 2003-519787 on Feb. 7, 2006, 5 pages.

European Patent Office, Communication pursuant to Article 96(2) EPC, mailed in related European Application No. 03799369.8-1243 on Jan. 23, 2006, 8 pages.

European Patent Office, Communication, mailed in related European Application No. 02752716.7 on Mar. 23, 2006, 2 pages.

* cited by examiner

Fig. 1 - PRIOR ART

SYSTEM AND METHOD FOR BOOTING FROM A NON-VOLATILE APPLICATION AND FILE STORAGE DEVICE

FIELD OF THE INVENTION

The field of the invention is microprocessor controlled devices, specifically the initialization or booting process of the devices.

BACKGROUND OF THE INVENTION

A generic computing platform consists of various hardware and software components. A main processor which contains a central processing unit (CPU), e.g., a microprocessor, is connected to a non-volatile code storage device (CSD), non-volatile application and file storage device (AFSD), random access memory (RAM) and other peripheral devices. The hardware dependent software that is required to initialize various hardware components is stored in the code storage device. In personal computer (PC) architecture this software is known as the BIOS (Basic Input Output System). The BIOS provides an interface between the operating system and the hardware. The process of execution of initialization software by the CPU is known as the "boot" process. A CPU can boot directly from a CSD, or in order to achieve higher performance can boot from a copy of the content of the CSD in RAM.

The background of the invention describes operation of a PC for illustrative purposes, but the invention relates more generally to starting operation of any intelligent device, and is not limited to PC architecture.

Referring to FIG. 1, in a generic computing environment, two types of non-volatile storage devices are used. These non-volatile storage devices are used for code storage and for application and file storage. Typically a code storage device (CSD) 45 has a much smaller capacity than an application and file storage device (AFSD) 40. In addition, a CSD is usually accessed after system power up or after system reset and its content is very infrequently updated by the computer system in comparison to an AFSD that is updated frequently by the applications or users of the operating system.

Traditionally the CSD 45 is hardwired to the system bus and is mapped into a specific memory location. After the completion of system power up reset or system reset, the CPU 30 will look for its initialization code in this specific location of CSD 45. This initialization code is dependent on system architecture or hardware, and in PC architecture is known as the BIOS. In other architectures this initialization code is referred to as initialization firmware, boot firmware etc . . . Examples of CSDs are EPROM, Flash ROM, and OTP PROM. An AFSD is used in order to store an operating system, application programs or general file and user data. An AFSD is a non volatile storage device such as solid state memory or a magnetic or optical drive The BIOS or booting firmware is normally stored in the CSD 45 in order for the CPU to execute its instructions. Traditionally if boot code is stored in the AFSD 40, a small set of instructions, constituting the basic BIOS must be stored in the CSD 45 in order to copy the BIOS or booting firmware into system RAM 50. In this invention, the requirement of the CSD for storing and executing these initialization instructions is eliminated.

SUMMARY OF THE INVENTION

In the system of the present invention, without at using the microprocessor to execute a set of instructions or changing system architecture, a smart logical interface circuit controls the computer system in order for an Application and File Storage Device (AFSD) to substitute for the functionality of the Code Storage Device (CSD). The circuitry loads the BIOS from the AFSD into Random Access Memory (RAM). An AFSD is a non-volatile memory storage device such as a solid state memory or a magnetic or optical drive. Upon its completion, the microprocessor then takes over the control and completes the system initialization process. Therefore there will not be any need for a CSD to store the BIOS. This initial loading logic circuitry (LLC) controls the initial loading of boot code. The LLC copies at least a sufficient amount of programming instructions from an AFSD into RAM to then allow a microprocessor to read the instructions, interface with the hardware, and take over operation of the system. These instructions are known as the BIOS in the specific embodiment of the PC used to illustrate the operation of the present invention, however in other platforms it may be referred to as firmware. The subset of the BIOS copied by the LLC is referred to as the "BIOS loader". However, the LLC has a much wider range of application than in PC architecture and the PC and its associated terms are only used for illustrative purposes. The LLC has applications in computing platforms ranging from small handheld devices such as digital cameras, personal audio players, personal digital assistants and sophisticated embedded systems such as telecommunication and networking equipment.

When the device power is turned on or the user presses a reset button, the microprocessor of the system executes the BIOS or firmware starting at a designated location in the system memory. If the microprocessor receives a HOLD or HALT it releases control of the ADDRESS, DATA, and other control lines. In this invention, the HOLD is either generated immediately after or simultaneously with the RESET. After the microprocessor is put on hold, the LLC selects one of the multiple BIOS storage locations that is preset and stored in registers of the LLC. The BIOS storage location is defined by the LLC, and can easily be relocated for various processors that may require different BIOS storage locations. In addition, multiple BIOSs can be stored in the AFSD and accessed by the LLC, thus the user can select a different BIOS for a different purpose and the system can be configured differently upon startup for different purposes. Once the AFSD is enabled, the BIOS loader is copied from the AFSD into RAM. Thereafter, the LLC releases the HOLD/RESET of the microprocessor and the microprocessor can execute the BIOS loader from RAM. In addition, after completion of the booting process, the Loading Logic Circuitry activates its write protect circuitry for protecting the BIOS or boot code portion of the AFSD. This will protect the BIOS or boot code portion from accidental overwriting or erasing. This protection can be overridden only by an authorized user.

Thus, a dedicated ROM chip can be eliminated from the system because the microprocessor need not access the BIOS instructions that are normally saved therein.

The above process assumes there is a HOLD or HALT type of signal to the microprocessor and the microprocessor will make the ADDRESS, DATA and control lines tri-stated. If the required signals cannot be tri-stated or there is no HOLD or HALT function to the microprocessor, tri-state buffers may be used to isolate the system bus used by the microprocessor from the buses used for the copying process.

DESCRIPTION OF EXEMPLARY EMBODIMENTS

Referring to FIGS. 2–6, the operation of the system of the present invention will be shown. Operation of the system is illustrated by using an example of NAND flash memory for the non-volatile application and file storage device (AFSD) 140 of FIG. 2 for descriptive purposes, however, the invention encompasses any type of non-volatile memory. This exemplary embodiment illustrates the system implemented with PC architecture, however the system of the present invention encompasses the startup of any intelligent device. The system has applications in many types of personal electronic devices such as music players/recorders, digital cameras, digital organizers, cellular phones, and a variety of other sophisticated embedded systems such as Telecommunication and Networking equipment.

Figure 2:
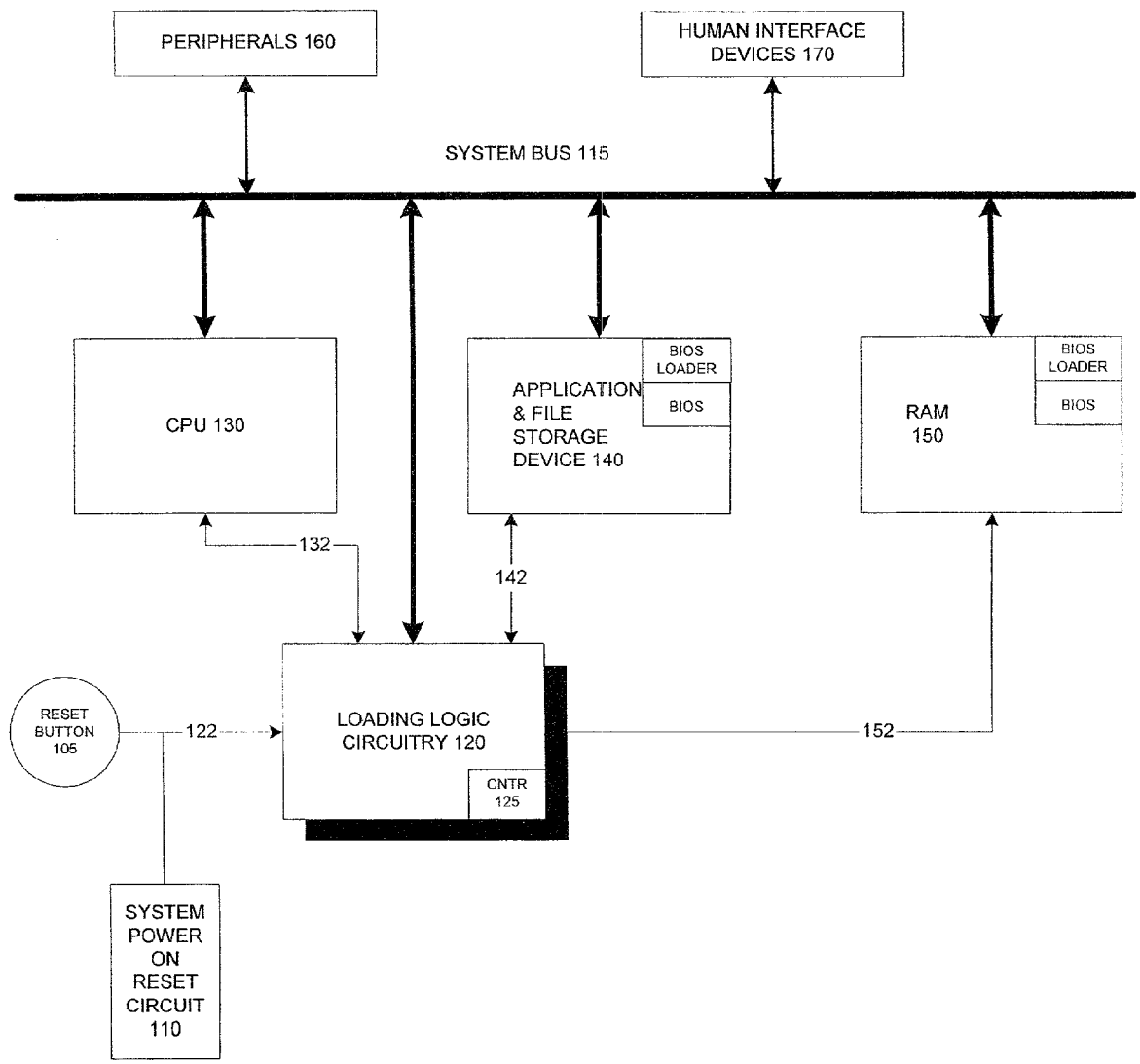
FIG. 2 is a block diagram of the components of the system.

In FIG. 2 the components of the system are illustrated. Loading Logic Circuitry (LLC) 120 is connected to reset button 105 and system power on reset circuit 110 by signal line 122. LLC 120 has an internal counter 125. System bus 115 is connected to LLC 120, CPU 130, AFSD 140, volatile random access memory (RAM) 150, peripherals 160, and human interface devices 170. Peripherals 160 can be printers or other output devices as well as additional drives and any other peripherals that are well known in the art. Human interface devices are things such as a keyboard, monitor, mouse, microphone or speakers and are likewise well known in the art. Control signal lines 132 connect LLC 120 with CPU 130, and control signal lines 142 connect LLC 120 with AFSD 140. In this illustrative example control signal lines 142 are connected to the control inputs of the NAND flash memory. Additional control signal lines 152 connect LLC 120 and RAM 150. RAM 150 has a portion of memory allocated for storage of the BIOS 200 and the BIOS loader 200a, a portion of the BIOS. The BIOS and the BIOS loader in RAM 150 is a copy of the BIOS and the BIOS loader in AFSD 140.

Figure 3:
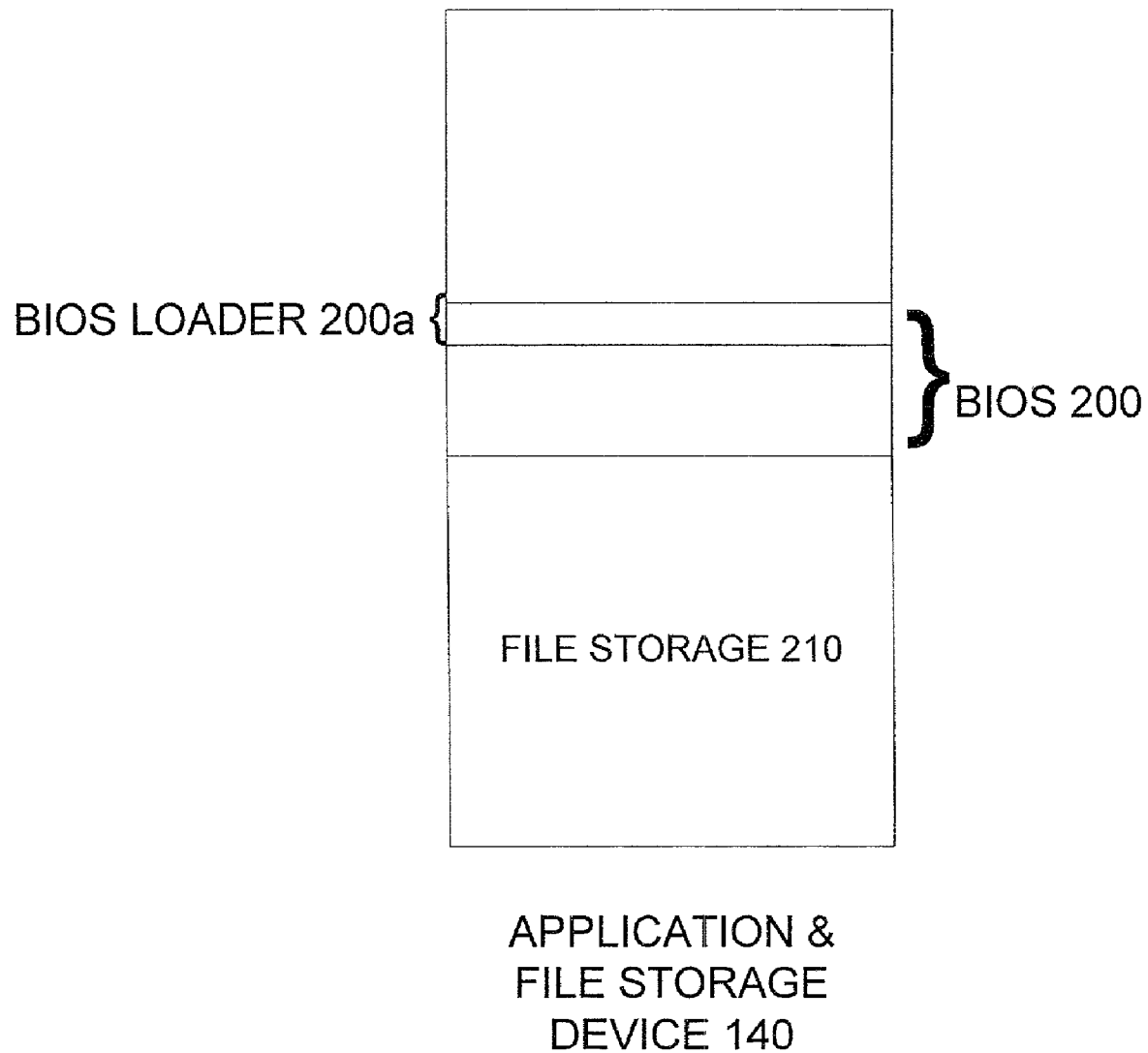
FIG. 3 is a diagram of the Application and file storage device of FIG. 2.

FIG. 3 shows AFSD 140 in more detail. AFSD 140 is used to store user files, such as documents, pictures or drawings, and music files as well as executable system files. This application and file storage device is also utilized to store BIOS 200 and the BIOS loader 200a of BIOS 200. The remainder of AFSD 140 comprises file storage portion 210. BIOS 200 only utilizes a relatively small proportion of AFSD 140 which has a capacity large enough to store a large number of files. For example AFSD 140 could have a capacity anywhere from 4 megabytes to several gigabytes.

Figure 4:
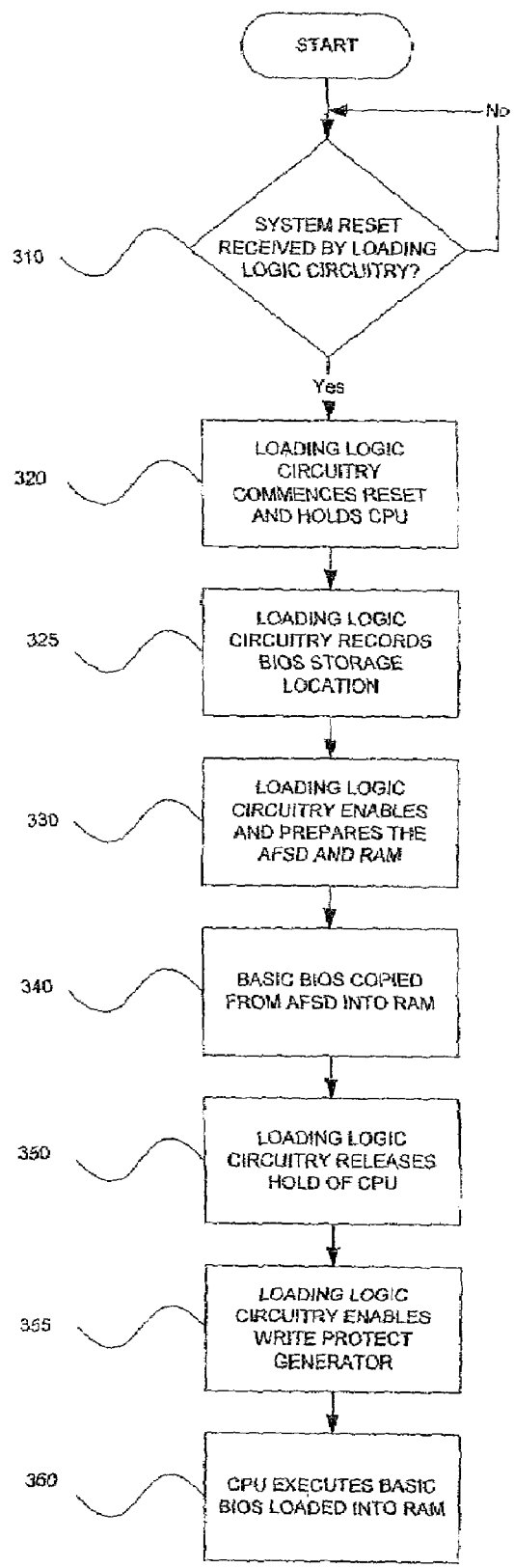
FIG. 4 is a flow chart of the operation of the system.

FIG. 4 shows the operation of the system components illustrated in FIG. 2. A system reset is triggered by either reset button 105 or by introducing or interrupting system power that triggers the system power on reset circuitry 110 in step 310. Either pressing the reset button or turning on the power will trigger Loading Logic Circuitry (LLC) 120. LLC 120 can also be triggered by other routines to reset the device. LLC120 comprises a finite state machine that controls the operation of the basic initialization process through logic circuitry either on board level components, or on application specific integrated circuitry (ASIC) such as a field programmable gate array (FPGA) or programmable logic device (PLD). Control of the basic initialization operation is not through a microprocessor such as a CPU.

After LLC 120 receives the system reset signal, it commences the RESET/HOLD process and suspends the operation of CPU 130 through control signal lines 132 in step 320. After the operation of CPU 130 has been suspended, LLC 120 records the location of BIOS 200 in AFSD 140 in step 325. LLC 120 then initiates and readies the AFSD 140 through control lines 142 for sending data over system bus 115 in step 330. LLC 120 also readies the RAM 150 to receive data through control lines 152 in step 330. Counter 125 is initialized to its preset initial value in step 330.

Next, LLC 120 copies the BIOS loader 200a from AFSD 140 over the system bus 115 into volatile RAM 150 in step 340. Counter 125 is incremented after each copy of data from AFSD 140 to RAM 150 in step 340. The BIOS loader 200a is an amount of the BIOS 200 sufficient to allow the CPU to start the boot operation. Thus, it must be sufficient to allow communications with and control over AFSD 140 and RAM 150. This can range anywhere from less than one page to ten pages and is preferably only one page, or 512 bytes of BIOS 200, when dealing with PC architecture. However, this amount could be on the order of tens of kilobytes in embedded systems. When BIOS loader 200a is more than 512 bytes error correction code can be used, whereas when BIOS loader 200a consists of one page (or less), error correction code is unnecessary because the integrity of the first page is generally assured because of pre-selection of the memory areas during manufacturing and testing. In applications where the integrity of a larger memory segment is assured a larger size of data can be copied without error correction. Furthermore, error correction code can be directly integrated and thus the integrity can be determined during the copying process, allowing even greater amounts of error free data to be copied. AFSD 140 can be any type of non-volatile, storage device such as a solid state memory, magnetic disk, optical disk, or tape drives.

In the preferred embodiment, AFSD 140 is NAND flash memory (NFM) and a brief discussion of the controls signals of NFM follows. NFM has an 8-bit data bus and 7 control signals, i.e., CLE (Command Latch Enable), ALE (Address Latch Enable), CE (Chip Enable), WE (Write Enable), RE (Read Enable), RB (Ready_Busy), and WP (Write Protect). The DATA bus is connected to the system bus 115 and the control signals are transmitted via control lines 142.

To access the NFM, the CE signal has to be in active state before any other signal can become active. A COMMAND is then written into the NFM followed by an ADDRESS, if the ADDRESS is required. The COMMAND code and the ADDRESS are presented through the data bus, illustrated as a part of the system bus 115. The RB (Ready_Busy) signal will indicate a busy state after writing of some commands or address. Subsequent operations are performed after RB indicates the ready state.

The content of the data bus contains a command if the CLE is active and the ALE is inactive. The content in the data bus contains data if the CLE and the ALE are in an inactive state. The content of the data bus is an address if the CLE is inactive and the ALE is active. Writing of an address requires multiple cycles of the WE signal depending on the size of the NFM. Content in the data bus is stored into NFM on the trailing edge of the WE signal.

To read data from the NFM, CLE and ALE are set to an inactive state before RE is set to an active state. When RE is active, the content from the NFM is presented to the data bus.

As shown in FIG. 3, AFSD 140 is used not only to store BIOS 200, but also to store various user files in file storage portion 210. Copying of the data is achieved by sending a read enable (RE) signal to AFSD 140 and a write (WR) signal to RAM 150 over control signal lines 142 and 152 respectively. At the same time, an address counter 125 within LLC 120 is enabled. The address counter starts to count from a preset value and continues to increment with each clock. The clock signal has a low portion and a high portion. The low portion is used for the RE signal of AFSD 140 to enable data transfer to the system bus 115 from AFSD 140, and at the same time is used for the WR signal of RAM 150. During low to high transition of the clock (rising edge of the clock) the data on the system bus 115 is copied into RAM 150 and the address counter is incremented. This copying of the data continues until the address counter reaches 01FFh which corresponds to the 512 bytes of BIOS loader in this example. After the BIOS loader has been copied AFSD 140 and RAM 150 are disabled by setting the CE signal of AFSD 140 and the CS signal of RAM 150 to an inactive state.

Upon the completion of copying of the BIOS loader into RAM 150, LLC 120 releases hold of the CPU in step 350. Thus all of the aforementioned activities were performed without involvement of the CPU.

With the CPU now active again, it is important that BIOS 200 cannot be overwritten by the CPU. In step 355 LLC120 enables a write protect generator to assure this cannot happen as will be described later with reference to FIG. 5.

Finally, with the BIOS loader once stored in AFSD 140 now located in RAM 150, in step 360 the CPU executes the BIOS loader and can now copy the remaining portion of BIOS 200 into RAM 150.

Figure 5:
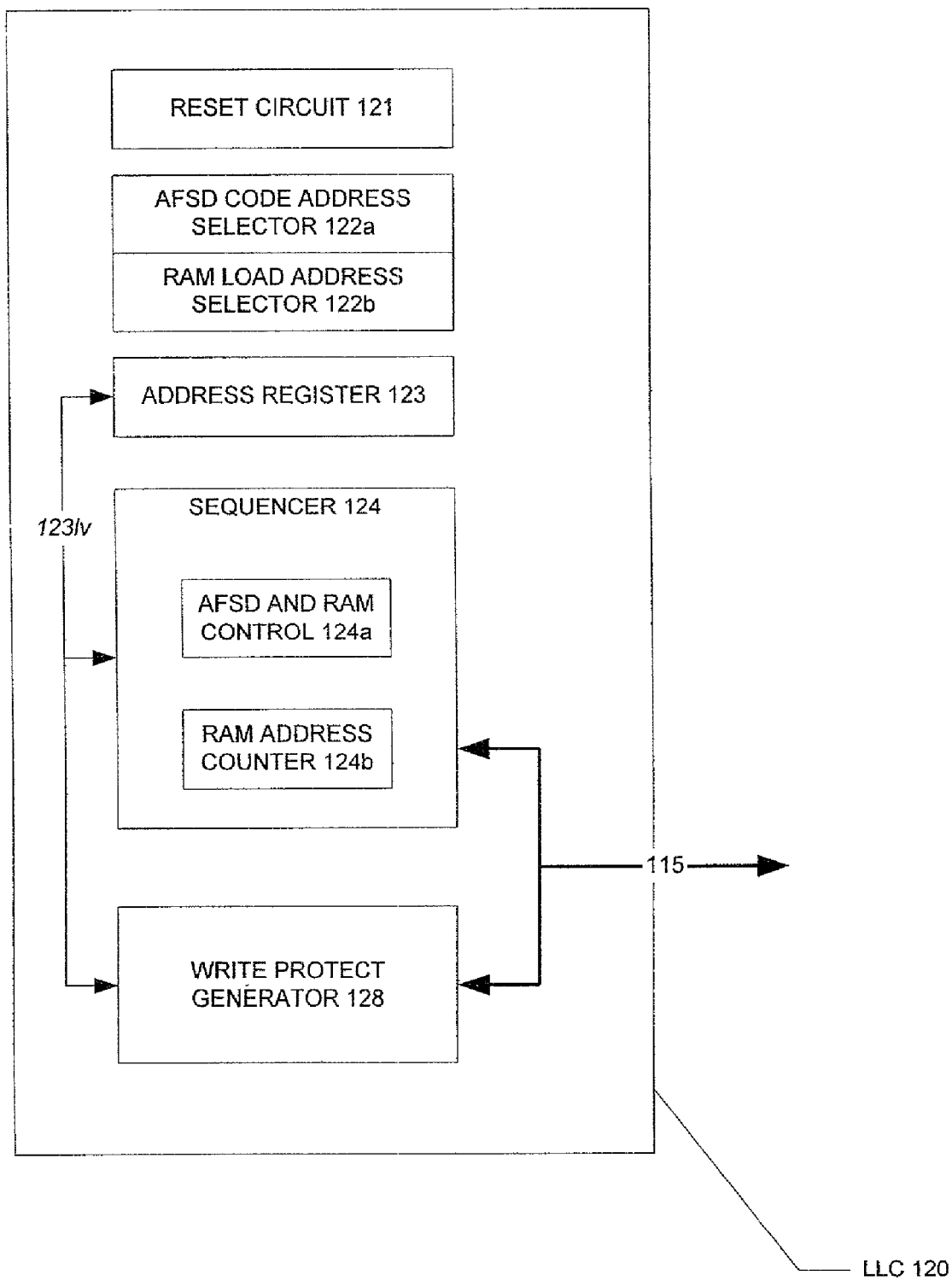
FIG. 5 is a Detailed block diagram of loading logic circuitry 120 of FIG. 2.

FIG. 5 is a detailed block diagram of loading logic circuitry (LLC) 120 of FIG. 2. LLC 120 comprises reset circuit (RC) 121, AFSD code address selector (ACAS) 122a, RAM load address selector (RLAS) 122b, address register (AR) 123 for BIOS 200 storage blocks, sequencer 124 including AFSD & RAM control circuit 124a and RAM address counter 124b, and write protect generator (WPG) 128 for the BIOS boot blocks in AFSD 140.

Reset Circuit 121 receives a reset signal over control line 122 from reset button 105 or system power on reset circuit 110 as shown in FIG. 2. After receiving a reset signal over control line 122, reset circuit 121 generates and sends a signal or signals over control lines 132 depending on the type of microprocessor used. RC 121 sends signal(s) that will make the microprocessor 130 tri-state its data bus, address bus and some necessary control signals. After RC 121 releases the signal, the CPU 130 will start execution at a designated address. If a microprocessor 130 has no ability to tri-state its bus then tri-state buffers may be used in order to suspend operation of CPU 130 while LLC 120 controls the initialization sequencing.

The BIOS stored in AFSD 140 can be located in one of multiple selectable locations using ACAS register 122a. The selected storage location of the BIOS is latched into AR 123 during a reset generated by RC 121. This latched value 123lv is used by the sequencer 124 for the starting address of BIOS loader 200a and by WIPG 128 for the block value where the BIOS is located. The location of the BIOS in RAM is also hardware selectable through RAM load address selector (RLAS) 122b.

Sequencer 124 is the sequential state machine that is initiated to start copying the BIOS loader 200a from AFSD 140 into RAM 150 starting at address 123lv specified by AR 123. This sequencer 124 includes AFSD & RAM control 124a and the RAM address counter 124b. The output of the RAM address counter 124b is used as the address to RAM 150 during the loading process. The output of the RAM address counter 124b is tri-stated at the completion of the load process. At the end of the copying, CPU 130 is released via signal lines 132.

Figure 6:
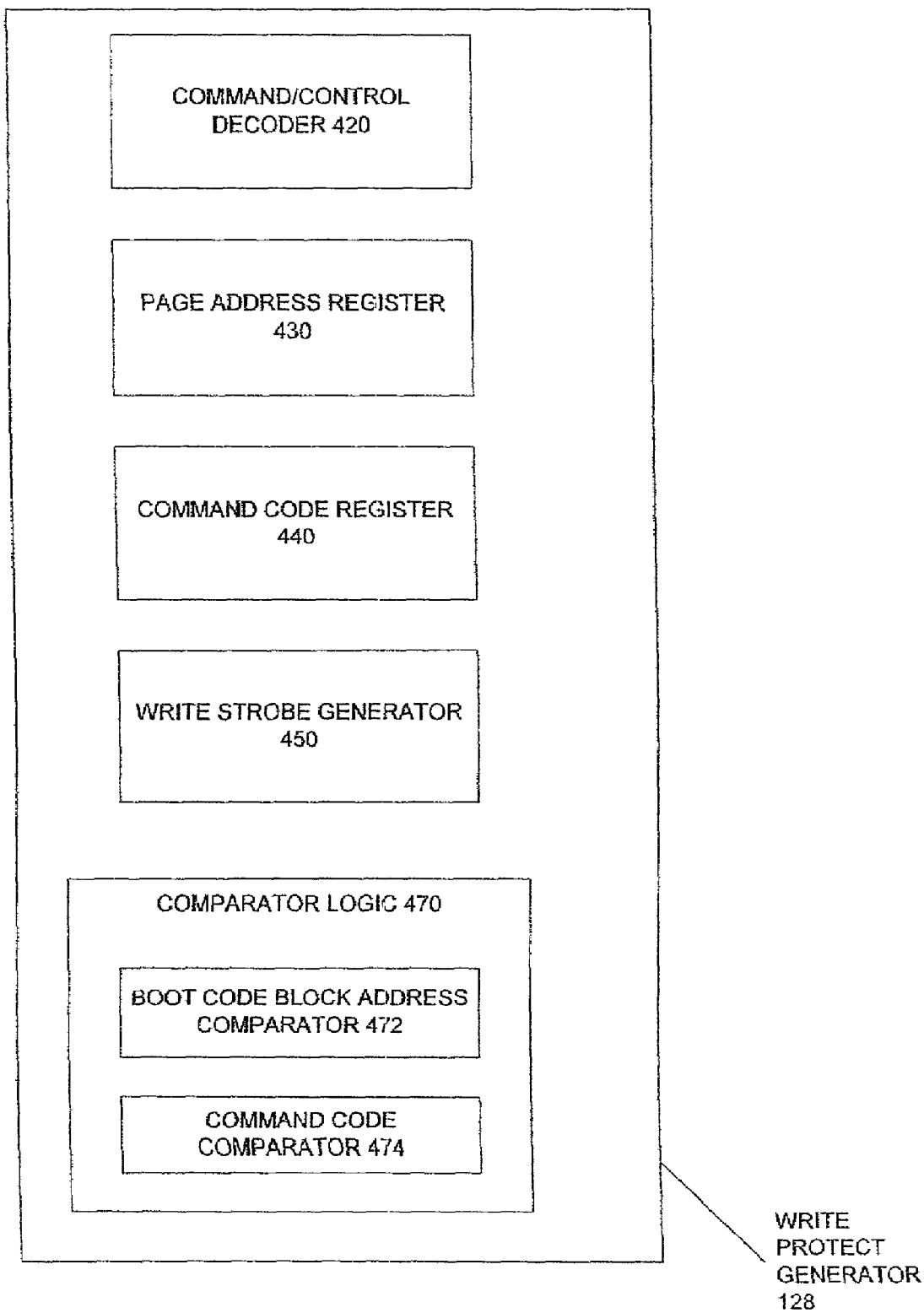
FIG. 6 is a Detailed block diagram of the write protect generator 128 of FIG. 5.

FIG. 6 is a detailed block diagram of the write protect generator 128 of FIG. 5. WPG 128 comprises a command/control decoder 420, page address register 430, command code register 440, write strobe generator 450, and comparator logic 470 including boot code block address comparator 472 and command code comparator 474.

WPG 128 protects the data in the boot code blocks, i.e. where the BIOS 200 is located in AFSD 140 so that any file or application is not written in the blocks where BIOS 200 is located, as seen in FIG. 3. If an attempt is made to write or to erase the boot code blocks of the AFSD, this generator will disable the strobe of the write enable to AFSD 140; it invalidates the operation and the write or erase operation is not performed.

Command/Control Decoder (CCD) 420 is a circuit that generates all necessary control signals to AFSD 140 over system bus 115. CCD 420 receives control signals from CPU 130 over the system bus 115, decodes the signals from the CPU, and sends the decoded signals over the control lines 142 to AFSD 140.

Figure 1:
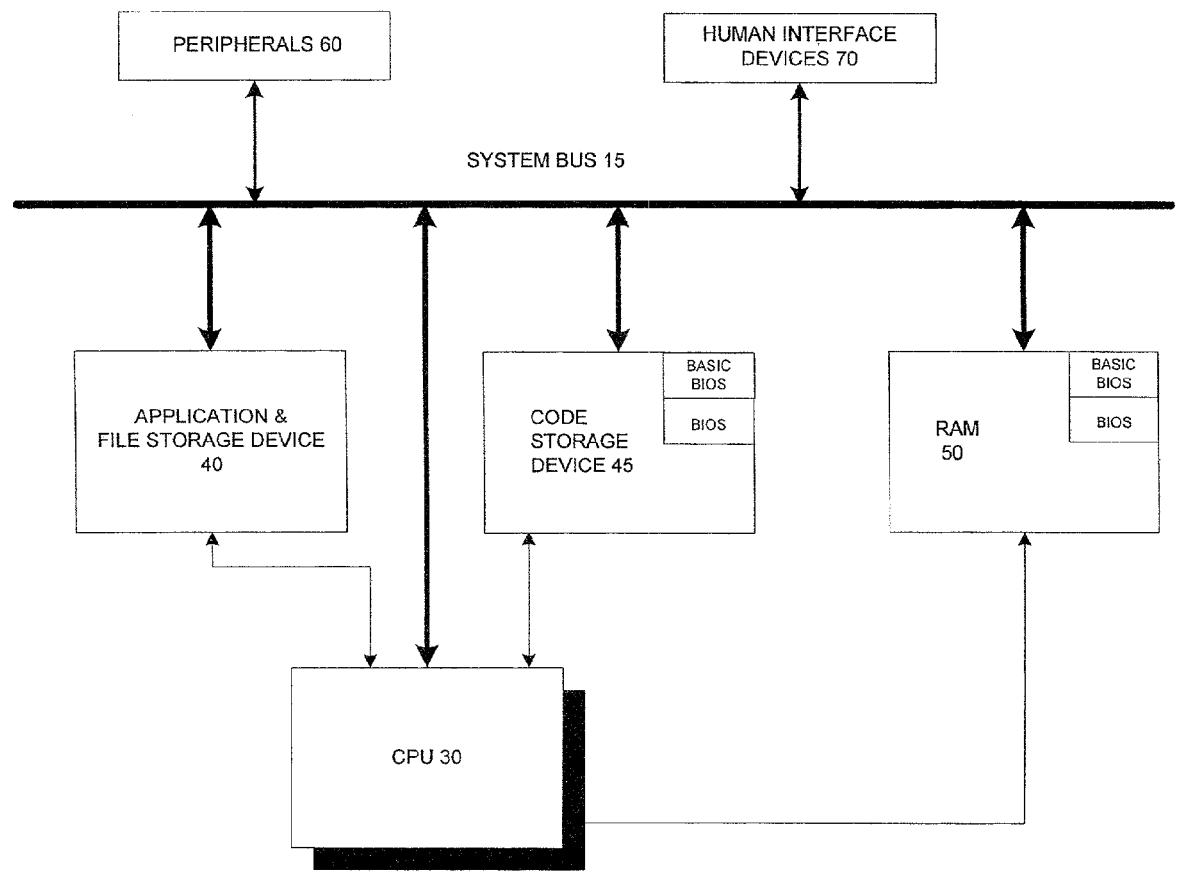
FIG. 1 is a prior art PC system using the conventional code storage device BIOS storage.

Page address register 430 maintains the address information for AFSD 140. When CPU 130 of FIG. 1 sends a designated address to AFSD 140, it is latched into this page address register 430. When CPU 130 sends a command to the AFSD 140, it is latched into the command code register 440.

Write strobe generator 450 controls the writing of the memory cells of AFSD 140. When CPU 130 writes to AFSD 140, whether the write is a command, an address or data, two write signals "WR_1" and "WR_2" are generated with one CPU write operation. WR_1 is generated first, then WR_2 is generated shortly after. WR_1 will latch the address and command code into the page register and command code register respectively for boot code block comparison. WR_2 is used as the WRITE ENABLE signal to AFSD 140.

Boot code block address comparator 472 compares the page address register 430 and the boot code block address 123lv. If the result is identical, the command code comparator 474 is enabled.

Command Code Comparator 474 checks the content of the command code register with the command "PROGRAM", "ERASE" or other commands which will modify the content of AFSD 140. If the content of the command code register is a "PROGRAM" or "ERASE" WR_2 will be disabled, and thus the program or erase operation will be prevented. Therefore, the BIOS 200 in AFSD 140 is protected from any modification.

This system is advantageous in many ways over prior designs. The BIOS is stored on a storage device that is used for application or file storage, and more importantly, a portion of the BIOS is copied from an AFSD into RAM without using a microprocessor executing commands located on a special purpose ROM. Thus, a dedicated chip such as the ROM, commonly used to store the BIOS in PCs, can be eliminated resulting in a substantial cost saving, smaller board size, and simplified interface structures. Additionally, the BIOS can be more easily altered when it is stored in an AFSD.

While an illustrative example of the invention has been shown and described, it will be apparent that other modifications, alterations and variations may be made by and will occur to those skilled in the art to which this invention pertains.

It is therefore contemplated that the present invention is not limited to the embodiments shown and described and that any such modifications and other embodiments as incorporate those features which constitute the essential features of the invention are considered equivalents and within the true spirit and scope of the present invention.

It is claimed:

1. A system for starting and controlling operation of an intelligent device comprising:
   a NAND flash memory application and file storage device configured to read and write data files, one or more of the data files including a basic input/output system (BIOS) interface;
   a random access memory (RAM);
   a loading logic circuit that configures the application and file storage device to operate and,
      places a chip enable signal of the application and file storage device in an active state;
      sends a command to the application and file storage device over a data bus of the device;
      awaits the application and file storage device to change state from a busy state, while processing the command, to a ready state;
      sets a command latch enable and read address latch enable signal to an inactive state;
      sends a read enable signal to the application and file storage device; and
      sends a write signal to the RAM,
   and thereby copies a portion of the BIOS from the storage device into the RAM.

2. The system of claim 1 wherein the loading logic circuit is configured to copy the portion of the BIOS from the application and file storage device into the RAM without using a microprocessor.

3. The system of claim 1 wherein the loading logic circuit is contained in a field programmable gate array(FPGA).

4. The system of claim 1 wherein the loading logic circuit is contained in a programmable logic device.

5. The system of claim 1 wherein the circuit comprises board level components.

6. The system of claim 1 wherein the loading logic circuitry stores the BIOS at any location of the storage device.

7. The system of claim 1 wherein the loading logic circuitry copies the BIOS to any location in the RAM.

8. The system of claim 1 wherein the loading logic circuitry comprises a write protect mechanism that prevents the location of the storage device having the BIOS from being overwritten.

9. The system of claim 8 wherein the write protect mechanism generates a first and second write strobe signal for each write strobe signal of a microprocessor.

10. The system of claim 9 wherein the first write strobe signal is separated from the second write strobe SIGNAL by a period of time, and wherein the first write strobe signal records the location of the BIOS in the storage device, and the second write strobe signal enables writing of the storage device.

11. The system of claim 10 wherein when the microprocessor attempts to write to the location of the BIOS in the storage device, the second write strobe signal is not generated whereby the BIOS is not overwritten.

12. The system of claim 1 wherein the loading logic circuit further comprises a means for protecting the basic input/output system (BIOS) interface on the application and file storage device from being overwritten.

13. A method of starting a smart device comprising:
   resetting operation of a microprocessor; and thereafter
   suspending operation of the microprocessor; and thereafter
   enabling operation of an application and file storage device with system level circuitry not provided as part of the application and file storage device; and thereafter
   copying a portion of a BIOS from the application and file storage device into RAM with said system level circuitry; and thereafter
   starting operation of the microprocessor.

14. The method of claim 13 wherein the storage device includes multiple BIOSs and wherein a user can select which BIOS to copy from the application and file storage device into RAM.

15. The method of claim 13 further comprising the step of reading the portion of the BIOS from the RAM with the microprocessor after the step of starting operation of the microprocessor.

16. The method of claim 13 wherein the step of copying the BIOS from a memory storage device into RAM is controlled by a state machine.

17. The method of claim 16 wherein the state machine is implemented in an Application Specific Integrated Circuit ASIC.

18. The method of claim 16 wherein the state machine is implemented in an FPGA.

19. The method of claim 13 wherein the application and file storage device is a flash memory device.

20. A method of providing an interface between an operating system and hardware devices comprising:
   storing the interface in an application and file storage device; and thereafter
   copying the interface from the application and file storage device into RAM without using a microprocessor by:
      enabling the application and file storage device and the RAM; and thereafter
      enabling an address counter to output a value; and thereafter
      correlating the value with a RAM address; and thereafter
      sending data from the application and file storage device over a data bus to the RAM address; and thereafter
      verifying the sent data with error correction code, and incrementing the address counter.

21. A system for booting a microprocessor controlled device comprising:
   an application and file storage device having a plurality of files, said application and file storage device not incorporating a controller for operating the device;
   a random access memory;
   a microprocessor;
   human interface devices; and
   an interface for communicating between the microprocessor, the application and file storage device and the human interface devices, the interface residing in a file of the file storage device; and means for copying a portion of the interface into the random access memory, said means functioning to directly control the read and write operations of the application and file storage device.

22. The system of claim 21 wherein the application and file storage device comprises a non-volatile solid state memory device.

23. The system of claim 21 further comprising a means for protecting the file on the file storage device from being overwritten.

24. A method of operating a smart device comprising:
providing a general purpose application and file storage device for the storage of user files;
allocating a small portion of the general purpose application and file storage device for a BIOS of the device;
resetting operation of a microprocessor; and thereafter
suspending operation of the microprocessor; and thereafter
copying a portion of a BIOS from the application and file storage device into RAM by
  enabling the general purpose application and file storage device and the RAM; and thereafter
  enabling an address counter to output a value; and thereafter
  correlating the value with a RAM address; and thereafter
  sending data from the application and file storage device over a data bus to the RAM address; and thereafter
  incrementing the address counter; and thereafter
starting operation of the microprocessor; and
using the general purpose application and file storage device to read and write user files, and during such usage, preventing the BIOS from being overwritten.

25. A method of starting and operating a processor controlled system comprising an operating system, hardware devices, and an interface between the operating system and the hardware devices, the method comprising:
storing the interface in a directly accessed NAND flash application and file storage memory; and thereafter
copying the interface from the application and file storage memory into RAM by:
  enabling the application and file storage memory and the RAM; and thereafter
  enabling an address counter to output a value; and thereafter
  correlating the value with a RAM address; and thereafter
  sending data from the application and file storage memory; and thereafter
  incrementing the address counter.

* * * * *